(No Model.)   3 Sheets—Sheet 2.
R. P. WILSON.
ELECTRIC CURRENT METER.
No. 596,283. Patented Dec. 28, 1897.
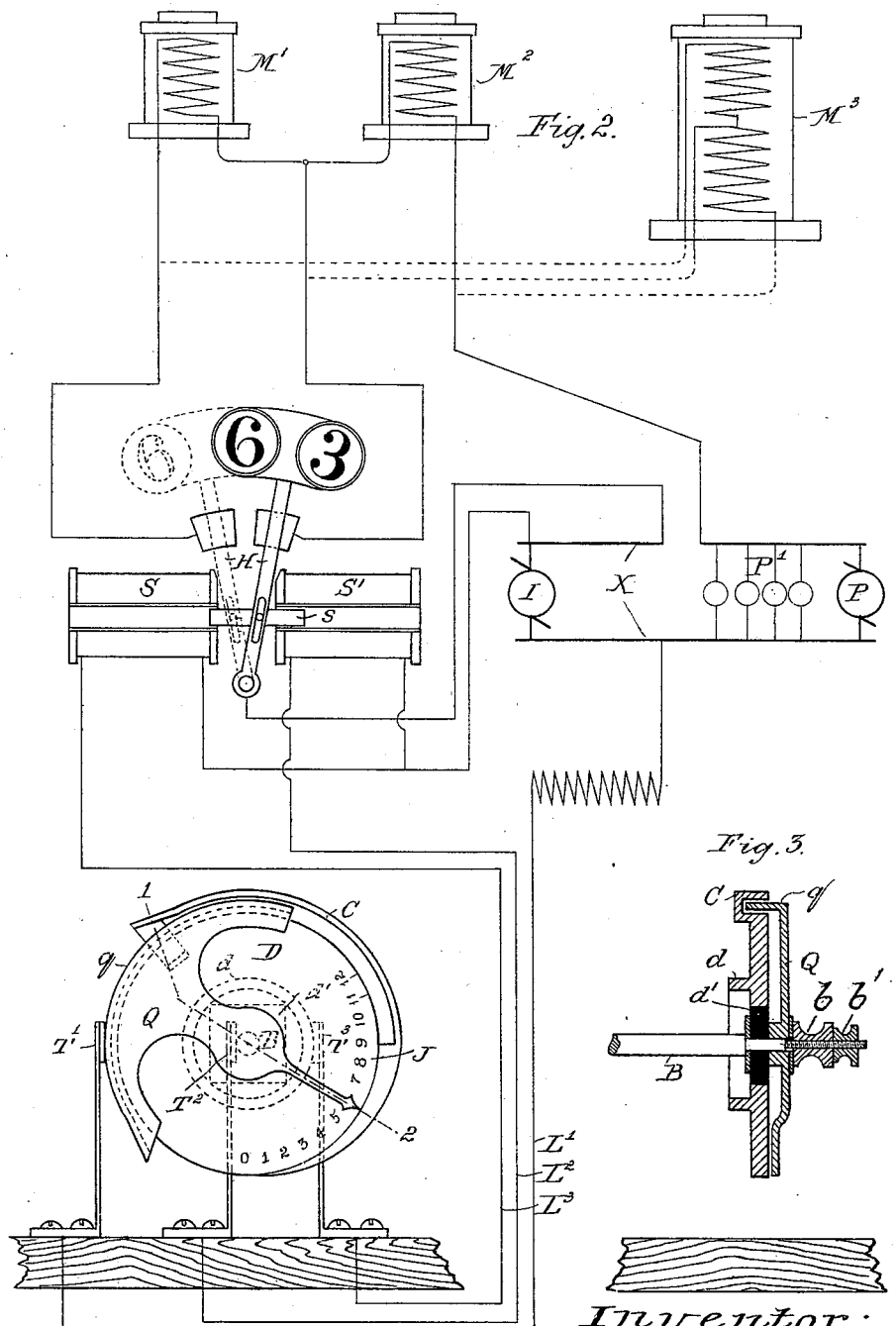

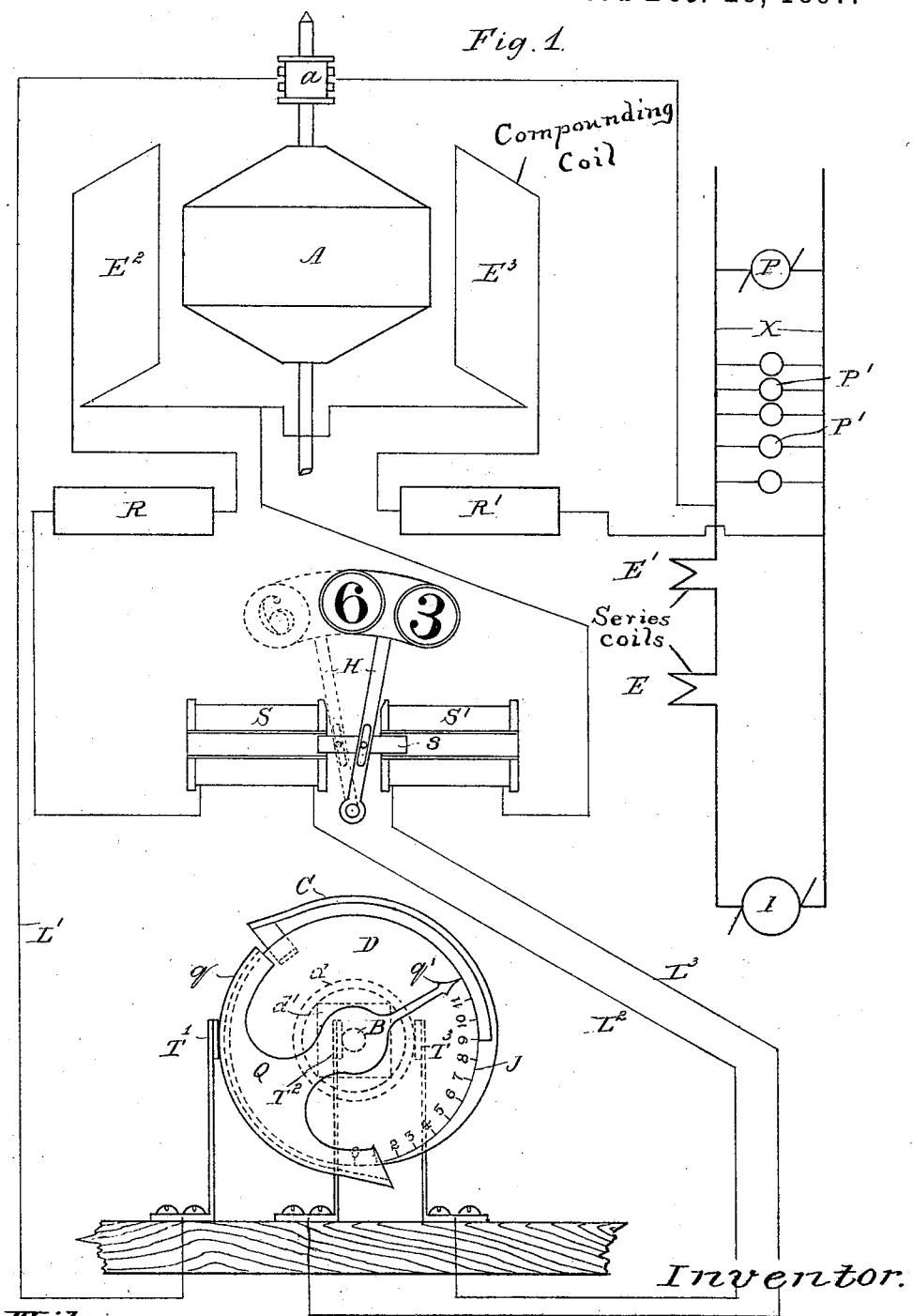

(No Model.) 3 Sheets—Sheet 3.

R. P. WILSON.
ELECTRIC CURRENT METER.

No 596,283. Patented Dec. 28, 1897.

Witnesses:
E. B. Bolton

Inventor:
Reginald Page Wilson
By his Attorneys

THE NORRIS PETERS CO., PHOTO-LITHO., WASHINGTON, D. C.

UNITED STATES PATENT OFFICE.

REGINALD PAGE WILSON, OF LONDON, ENGLAND.

ELECTRIC-CURRENT METER.

SPECIFICATION forming part of Letters Patent No. 596,283, dated December 28, 1897.

Application filed March 24, 1897. Serial No. 629,069. (No model.)

*To all whom it may concern:*

Be it known that I, REGINALD PAGE WILSON, a subject of the Queen of Great Britain and Ireland, and a resident of 3 Prince's Mansions, Victoria Street, London, England, have invented certain new and useful Improvements Relating to Electric-Current Meters, of which the following is a specification.

My invention relates to electric-current meters, and has for its object to provide a differential device by which current used at different periods or parts of a day may be separately or proportionately metered and automatically registered, so that differential rates or charges per unit may be made for the current consumed—for example, lower rates during the day hours of minimum demand, so that encouragement may be afforded to consumers to use the current at times when there is least duty on the generating plant.

Further objects refer to matters of detail—first, to indicate how long the clock has gone since it was last wound up, and, second, to secure that from the moment of stoppage until the clock is again started and the apparatus rearranged the meter shall register continuously, but only at the higher rate of charge and not at the lower rate.

My invention comprises an automatic switch attachment for ordinary meters whose function is to alter the number of turns in the series coils or the resistance in the shunt-circuit of the meter, as the case may be, and means for carrying out the details above referred to.

In fully describing my invention I will refer to the accompanying drawings, in which—

Figure 4:
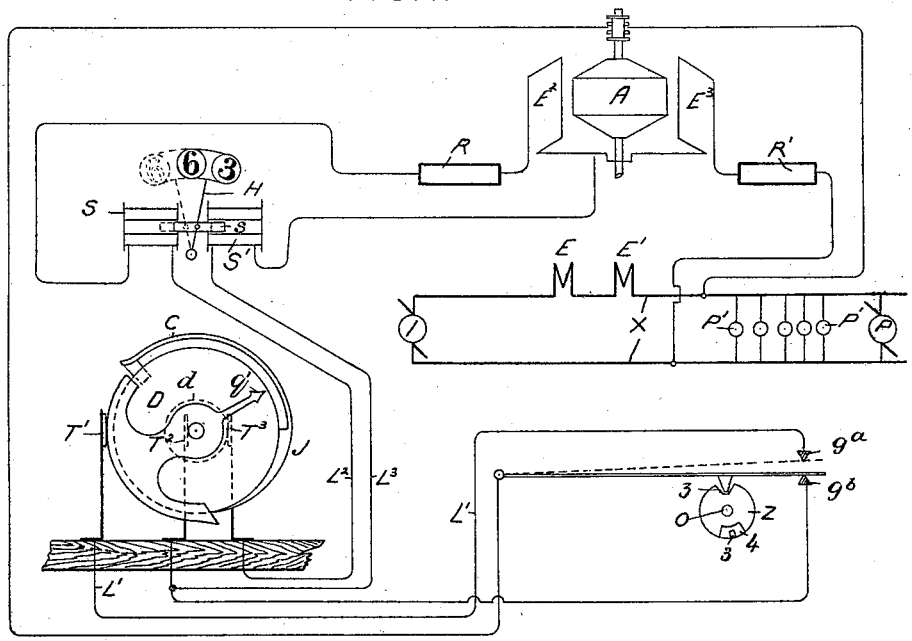
Figure 5:
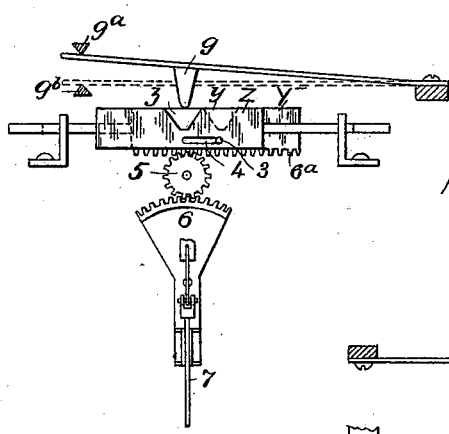
Figure 8:
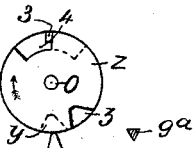
Figure 9:
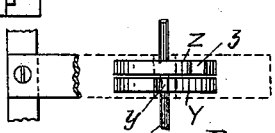
Figure 10:
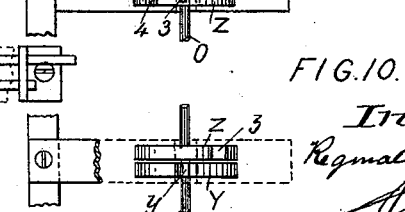

Figure 1 shows my switch in elevation and a diagram of connections by which the resistance in the shunt-circuit of the meter may be automatically altered to effect my purpose. Fig. 2 shows a diagram of connections in which two meters are used, or, alternatively, one meter in which the ampere-turns in the series coils are varied; and Fig. 3 is a transverse section on line 1 2 of the switch as it appears in Fig. 2. I will assume that the differential rates to be charged are three pence and six pence. Fig. 4 is a diagram of connections and parts, illustrating how the higher rate of charge is automatically effected on stoppage of the clock. Fig. 5 is a front elevation, Fig. 6 a plan, and Fig. 7 a side elevation, of one arrangement of appliance for effecting the above purpose. Fig. 8 is an elevation, and Figs. 9 and 10 plans in changed positions, of a modified form of similar apparatus.

In carrying out my invention I employ a special construction of automatic time-switch, consisting of a metal disk D of good conductivity, which may with advantage be provided with a silver contact edge in the usual way. It is mounted on a shaft B and completely rotated, preferably, by a self-winding clock once in twenty-four hours or as required, suitable insulation $d'$ between shaft and disk being provided. Upon the same shaft B is mounted so as to be revoluble thereupon a shield or quadrant Q, provided with a flange covering or embracing a certain part of the periphery of the disk D. Upon the disk D is formed or cut out or mounted a cam C, preferably of the volute or snail-wheel shape, such as is shown in Figs. 2 and 3, and so constructed as to be capable of covering, according to its position, wholly or in part the outer edge of the quadrant Q. The flat peripheral flange $q$ of the quadrant Q is adapted to pass freely around within the space between the disk D and the cam C, suitable air-gaps being left at each side thereof, as shown best in Fig. 3. The position of the quadrant Q in relation to the cam C and of both of these devices in relation to the clock-driven spindle B is adjustable to suit circumstances by a clamp device, such as the screwed spindle and nuts $b\ b'$, so that when the switch has once been adjusted and clamped the parts will all move together. The important advantage of this universal adjustment is that the switch may be so set that the six-pence rate commences at any hour of the day and continues for any required or determined period. An index-hand $q'$ is fixed to the quadrant Q and a graduated hour-scale J is marked upon the disk D, whereby the distance of travel of the contact-maker T' over the quadrant Q can be accurately ascertained by inspection when required.

Referring to the diagrammatic parts of Fig. 1, the contact T' is electrically connected by L' with the armature A. I is the source of supply; X, the distributing-circuit. P and P' represent motors, lamps, or other translating devices. E E' are the series coils, and E² E³ the compounding-coils, of the meter, A its armature, and $a$ the commutator. It will be seen that two compounding-coils E² E³ are shown in the figure, only one of which is in use when the full current is flowing through it to the armature A, but when the meter is to register at half-rate the compounding effect is increased by utilizing part of the added resistance to form an additional compounding-coil.

Two or more electric circuits may be connected to the switch. For the sake of clearness two only are shown diagrammatically at L² L³. Each is connected through a spring contact device T² T³, rubbing, respectively, upon a raised circular path $d$ on the disk D and on part of the frame of the quadrant Q. A circuit will therefore be completed by the springs T' T³ through the cam and disk or by the springs T' and T² through the quadrant. When by the rotation of the disk D the rubbing contact T' passes off the cam C, it falls and rubs upon the outer edge of the quadrant Q, as shown, and one circuit is then broken and the other circuit completed. In circuit with L² and L³ are placed suitable resistances R R', through which the shunt-current of the meter passes, thereby causing a more or less amount of current or energy to be registered for that period of time which is occupied by the quadrant Q passing under the said contact device T'. Similarly when two meters are used the armature of one may be thrown out of action by this automatic change of circuit. Thus the amount of current consumed during any given period of a day is registered in proportion to the rate to be charged for same during that period.

In some cases it may be preferable in connection, for example, with ampere hour-meters to use two meters or to so arrange the winding of one meter as to provide for the alteration in the ampere-turns in such proportions as may be required. In such cases I so construct the relay whose primary object is to show the rate at which the current is being charged at any given moment that it shall operate an ordinary switch suitable for altering the connections, as above explained. Such an arrangement is diagrammatically shown in Fig. 2, wherein M' M² are two ampere hour-meters so connected that one only is in use during the hours when the three-pence rate is charged, while both are in use during the hours when the six-pence rate is charged, so that M² registers the total amount of units supplied when M' only registers those supplied at the six-pence rate. In cases where it is not considered necessary to have a record of the actual number of units supplied at each rate a meter with a duplicate winding may be used, as shown dotted at M³, Fig. 2. In this case the number of ampere-turns is so varied that the meter registers at double the speed during the six-pence rate that it does during the three-pence rate.

In combination with apparatus such as is above described it is advantageous to use a device for indicating to the consumer the rate at which current is being charged for at any time. To this end I employ an arrangement of solenoids S S', corresponding in number to the different rates charged, (which are assumed to be six pence and three pence.) Each solenoid is connected in series with its own circuit and adapted when energized to attract an armature $s$ and expose a disk or tablet on which is marked the price per unit for the time being.

It will be seen that in both the two cases above described my improved time-switch serves to energize the solenoids S' S², which, in addition to indicating the rate at which the current consumed is being charged for at any givent moment, also actuate in turn the switch-lever H, and thereby alter the connections of the meter or meters so as to produce the result above described. Manifestly any convenient form of switch with mercury or rubbing contacts may be used to alter these connections; but the switch shown diagrammatically in Fig. 2 will serve to illustrate the method. Further, it may be advisable to so construct and arrange the switch-lever that the circuit of the solenoid which has attracted it becomes broken when the lever H arrives at its ultimate position. The object of this is of course to avoid loss of energy, which would result from unnecessarily keeping one solenoid always energized. It will generally be necessary to commence or terminate the higher or six-pence rate at different hours of the day, (varying with the period of the year,) and to facilitate this operation the connection between the clock and the switch is made in such way that the moving by hand of the pointers of the clock serves to adjust the switch as follows: The spindle B, as before indicated, is connected with the hour-hand of a clock. (Not shown.) Assume, for example, that it is desired to commence the six-pence rate at four p. m. and to terminate it at seven p. m. First set the hands of the clock referred to to four o'clock. Then loosen the clamps $b\ b'$ and adjust the disk D on the spindle B so that the contact T' just falls off the end of the cam C. Then again move the hands until the clock stands at seven o'clock. Then adjust the quadrant until the spring T'' just falls off its end. Then clamp all the parts together by tightening up $b\ b'$ and start the clock, having previously set it to the proper (or "Greenwich") time. The automatic switch attachment is then ready when four o'clock arrives to alter the meter connections so that six pence will be charged for the units consumed until seven o'clock, when the contact T' will fall off the quadrant Q and return to the disk, thereby completing circuit L' L² and indicating the three-pence rate of charge.

I prefer to use a clock equipped with an ordinary arrangement of day-dials and gear fitted with a clutch, so that they may be set to zero for indicating by inspection how long the clock has gone since it was last wound up and consequently what length of time has elapsed since it stopped.

I will now explain the means I employ for insuring that from the moment the clock stops until it is again started and the apparatus rearranged the meter shall be free to register continuously, but only at the higher rate of charge and not at the lower rate at all. The advantages of this will be apparent as affecting both the consumer and the "undertakers."

Figure 6:
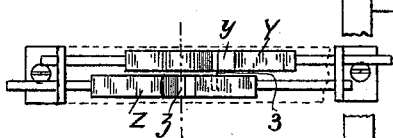
Figure 7:
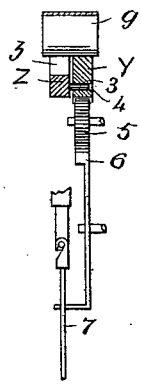

Referring to Figs. 4 to 10, I employ two adjacently-disposed bodies Y Z, arranged either to reciprocate in parallel planes, as in Figs. 5, 6, and 7, or to oscillate about a common center O, as in Figs. 4, 8, 9, and 10. One of these bodies, Y, carries a pin 3, moving in a slot or groove 4 in the other one, Z. The slot may be formed in the disk Y, if desired, in which case the disk Z would carry the pin. Motion may be transmitted to the body Y in any convenient manner, such as by the intermediate pinion 5 and rack-teeth 6 $6^a$, from and by the oscillation of the clock-pendulum 7. The bodies Y and Z have cut in them recesses or grooves $y$ $z$, respectively, which are normally lineable with each other, and a spring-coupler 9 is adjacently disposed. Its motion is limited by stops $9^a$ $9^b$, and a wedge-shaped piece 9 on it is adapted when the recesses $y$ $z$ are in line to fall simultaneously into same, as shown in Fig. 4, and then complete through $9^b$ an electric circuit through the armature A and then through $L^3$ S' $E^3$ R', by which the required change in the meter-circuit is effected, so as when the clock stops to cause it to register continuously at the higher rate. It is plain that if the two grooves $y$ $z$ form a continuous recess when the arrangement is at rest they cannot do so when the parts Y Z are in sliding or oscillating motion—that is, when the clock is going—because the driven one of them, Y, will move from its original position before the other one, Z, commences to be moved by the pin 3. Continued motion of Y will by the action of pin 3 and slot 4 then carry the other one, Z, with it until its total movement from its center or normal position has amounted to, say, three times the width of the groove $y$. Y then commences to return, but does not carry Z with it until it has traveled through a distance equal to about twice the width of the said groove. Any motion of Y will lift the coupler 9 out of the grooves $y$ and $z$ and it cannot fall back until the grooves again coincide. Now when Y has traveled, say, the length of three grooves' width it will be in its original position, but Z will be so situated that its groove $z$ is to one side of its original position. Following this movement through a complete cycle it will be seen that so long as the amplitude of the motion is maintained the grooves $y$ $z$ cannot combine and then the other electric circuit $9^a$ L' T' and then through $T^2$ or $T^3$, as already described, is closed at the proper times by the automatic switch above described, so that the meter will register at the lower rate. The gradual reduction in the amplitude when the clock is stopping has the effect of gradually bringing the said two grooves $y$ $z$ in a line and allowing the spring-coupler 9 to again drop into them and so complete that electric circuit which causes the meter to register at the higher rate.

Having now described my invention, what I claim as new, and desire to secure by Letters Patent, is—

1. In combination with an electricity-meter adapted to register the amount of electric current used at different periods of the day, a switch and a clock mechanism for operating the same, said switch having circuit-closing devices which are adjustable and are adapted to be set to act at any desired period of the day, and an indicating device showing the rate at which the meter is registering at any given time, substantially as described.

2. The combination with an electricity-meter of the improved arrangement for automatically controlling the ratio which the amount of electrical energy or current consumed bears to the current registered, consisting essentially of the automatic clock-driven switch attachment comprising the rotary metallic clock-driven disk D, the revoluble shield or quadrant Q with flat peripheral flange $q$, the snail-wheel cam C, the means for universal adjustment of the parts, the rubbing contacts T', $T^2$, $T^3$ and indicating devices, said adjustable parts and contacts being adapted to close different electric circuits at different periods of the day, all arranged and adapted for use substantially in the manner and for the purposes herein set forth.

3. The combination with one electricity-meter having series or shunt coils of the rotary metallic clock-driven switch attachment provided with means for universal adjustment and with rubbing contacts adapted to vary the ampere-turns in the said series or shunt coil of the meter as required by short-circuiting a suitable number of said ampere-turns, and indicating devices for showing the rate of registration, all substantially as herein shown.

4. In combination with the meter the plurality of circuits having means to secure different rates of registration, a clock-driven switch for controlling said circuits and the means for insuring automatically the higher rate of registration by the meter upon stoppage of the clock, consisting of two moving connected bodies Y, Z, driven by the said clock and having recesses, combined with spring-coupler and electric contacts, with circuit connections to the meter to cause a registration at the higher rate, substantially as described.

5. In combination with the meter, a plurality of circuits controlling the same to make said meter register at different rates, a plurality of contacts controlling the said circuits, a clock-driven switch having adjustable parts for controlling the closing of the circuits through said contacts, and means for automatically insuring the higher rate of registration by the meter upon the stoppage of the clock comprising a circuit-closing device with circuit connections to the meter, said circuit-closer being held open by the movement of the clock, substantially as described.

6. A device for automatically changing the position of the indicator (showing the price charged when the clock stops) and brought into operation by the stopping of said clock consisting in the combination of two oscillating bodies, interconnected by a pin-and-slot device and a spring-contact and working differentially so long as the clock is in motion, an indicator free of said oscillating device so long as the clock goes but electrically operated by the closing of circuit through the spring-contact immediately upon the stoppage of the clock, substantially as set forth.

In witness whereof I have hereunto set my hand in presence of two witnesses.

REGINALD PAGE WILSON.

Witnesses:
FRED C. HARRIS,
ALFRED B. CAMPBELL.